(12) United States Patent
Vasudevan et al.

(10) Patent No.: US 9,736,011 B2
(45) Date of Patent: Aug. 15, 2017

(54) SERVER INCLUDING SWITCH CIRCUITRY

(75) Inventors: Anil Vasudevan, Portland, OR (US); Parthasarathy Sarangam, Portland, OR (US); Ilango S. Ganga, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 287 days.

(21) Appl. No.: 13/995,231

(22) PCT Filed: Dec. 1, 2011

(86) PCT No.: PCT/US2011/062912
§ 371 (c)(1),
(2), (4) Date: Jun. 18, 2013

(87) PCT Pub. No.: WO2013/081620
PCT Pub. Date: Jun. 6, 2013

(65) Prior Publication Data
US 2013/0268619 A1    Oct. 10, 2013

(51) Int. Cl.
G06F 15/167    (2006.01)
H04L 12/24    (2006.01)
G06F 13/38    (2006.01)

(52) U.S. Cl.
CPC ............ H04L 41/04 (2013.01); G06F 13/385 (2013.01)

(58) Field of Classification Search
CPC . H04L 63/0485; H04L 67/1097; H04L 69/16; H04L 45/745; H04L 49/102;
(Continued)

(56) References Cited

U.S. PATENT DOCUMENTS 5,913,028 A * 6/1999 Wang et al. .................. 709/203
6,167,489 A * 12/2000 Bauman et al. .............. 711/145
(Continued)

FOREIGN PATENT DOCUMENTS

WO    2013/081620 A1    6/2013

OTHER PUBLICATIONS

International Search Report and Written Opinion received for PCT Patent Application No. PCT/US2011/062912, mailed on Aug. 22, 2012, 9 pages.
(Continued)

*Primary Examiner* — Dustin Nguyen
(74) *Attorney, Agent, or Firm* — Christopher K. Gagne

(57) ABSTRACT

An embodiment may include at least one server processor that may control, at least in part, server switch circuitry data and control plane processing. The at least one processor may include at least one cache memory that is capable of being involved in at least one data transfer that involves at least one component of the server. The at least one data transfer may be carried out in a manner that by-passes involvement of server system memory. The switch circuitry may be communicatively coupled to the at least one processor and to at least one node via communication links. The at least one processor may select, at least in part, at least one communication protocol to be used by the links. The switch circuitry may forward, at least in part, via at least one of the links at least one received packet. Many modifications are possible.

25 Claims, 5 Drawing Sheets

(58) Field of Classification Search
CPC ... H04L 45/60; H04L 12/4633; H04L 61/103; H04L 67/28; G06F 9/5027; G06F 12/0806; G06F 12/0893; G06F 9/3851
USPC .............. 709/201, 203; 711/144, 145, 118; 710/33; 370/412, 463, 230, 331, 389, 370/217, 254
See application file for complete search history.

(56) References Cited

U.S. PATENT DOCUMENTS

| | | | |
|---|---|---|---|
| 7,606,249 B1* | 10/2009 | Swenson | 370/412 |
| 7,636,835 B1 | 12/2009 | Ramey et al. | |
| 8,750,164 B2* | 6/2014 | Casado | H04L 12/4633 370/254 |
| 9,319,375 B2* | 4/2016 | Gross, IV | H04L 61/103 |
| 2003/0046330 A1* | 3/2003 | Hayes | 709/201 |
| 2003/0074475 A1 | 4/2003 | Ollikainen | |
| 2004/0148473 A1* | 7/2004 | Hughes et al. | 711/144 |
| 2005/0129040 A1* | 6/2005 | Kiel | H04L 49/102 370/412 |
| 2005/0226238 A1* | 10/2005 | Hoskote | H04L 45/745 370/389 |
| 2006/0129585 A1 | 6/2006 | Ishiki et al. | |
| 2006/0251109 A1* | 11/2006 | Muller | H04L 45/745 370/463 |
| 2006/0259704 A1 | 11/2006 | Wyman | |
| 2007/0121499 A1* | 5/2007 | Pal | H04L 45/60 370/230 |
| 2008/0062927 A1* | 3/2008 | Zhu | G06F 9/3851 370/331 |
| 2009/0006668 A1* | 1/2009 | Vasudevan et al. | 710/33 |
| 2009/0157961 A1* | 6/2009 | Gregg | G06F 12/0893 711/118 |
| 2009/0285223 A1 | 11/2009 | Thomas | |
| 2015/0124583 A1* | 5/2015 | May | H04L 67/28 370/217 |

OTHER PUBLICATIONS

International Preliminary Report on Patentability and Written Opinion received for PCT Patent Application No. PCT/US2011/062912, mailed on Jun. 12, 2014, 6 pages.

* cited by examiner

SERVER INCLUDING SWITCH CIRCUITRY

FIELD

This disclosure relates to a server that includes switch circuitry.

BACKGROUND

In one conventional network arrangement, a server is coupled to a switch. The switch is coupled to clients. The server provides application and network management services to the clients via and/or using the switch.

Typically, the server is based upon open and/or general purpose processor architectures, and the switch is based upon proprietary, special purpose, and/or application specific architectures. As a result, the programming languages, technologies, interfaces, and/or techniques that are used to program the server are generally incompatible with those are used to program the switch. This may significantly increase the amount of effort and/or expense involved in programming, modifying, and/or maintaining this conventional arrangement.

In this conventional arrangement, the server and the switch each constitute respective, separate network nodes that are coupled together via one or more network links. In the server, the one or more network links are coupled to a network interface controller. The network interface controller is coupled via an interconnect system to the server's processor and system memory. Data to be transmitted from the processor to the switch is stored in the system memory, is retrieved therefrom via the interconnect system by the network interface controller, and after being retrieved, is transmitted by the network interface controller to the switch via the one or more network links. A reverse process is used to transmit data from the switch to the processor. These data transmission processes involve significant amounts of latency and/or protocol processing (e.g., to address different protocols employed by the network links and the interconnect system).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
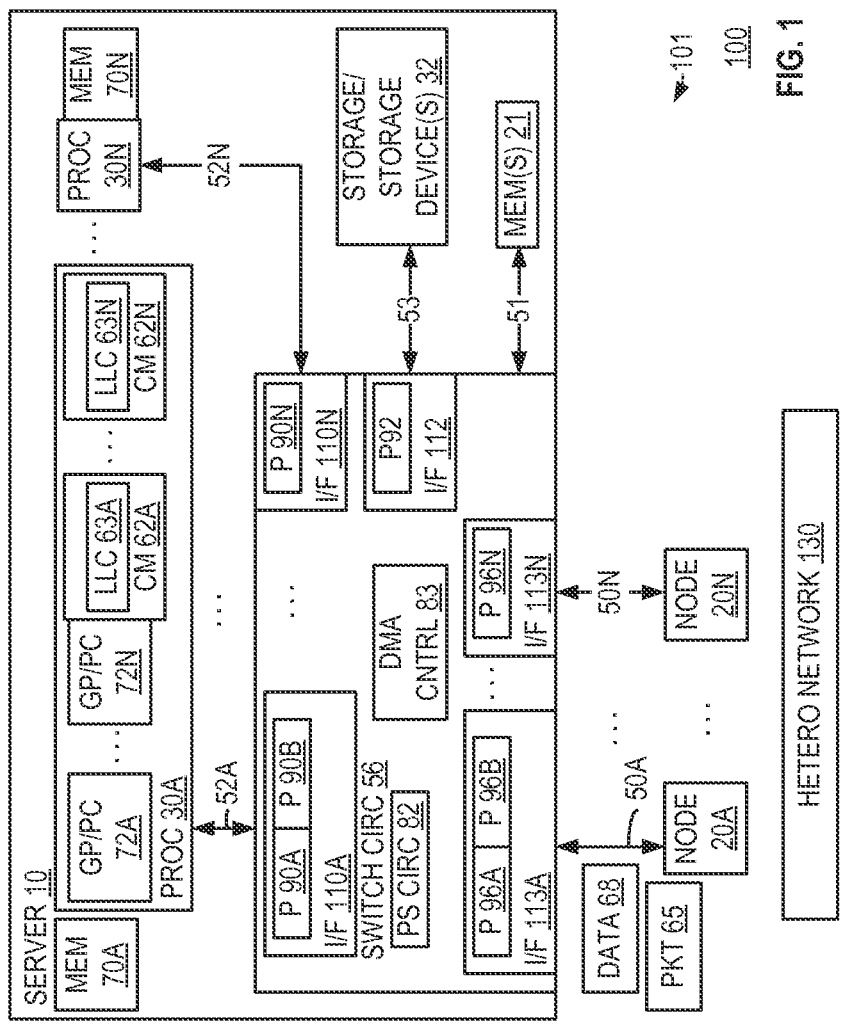
FIG. 1 illustrates a system embodiment.

FIG. 1 illustrates a system embodiment 100. System 100 may include one or more networks 101. One or more networks 101 may comprise one or more servers 10 that may be communicatively coupled via one or more (and, in this embodiment, a plurality of) communication links 50A ... 50N to one or more (and, in this embodiment, a plurality of) network nodes 20A ... 20N. Although not shown in FIG. 1 for purposes of clarity of illustration, one or more nodes 20A ... 20N may be, comprise, and/or be communicatively coupled to one or more heterogeneous networks 130.

In this embodiment, the terms "host computer," "host," "server," "client," "network node," and "node" may be used interchangeably, and may mean, for example, without limitation, one or more end stations, mobile interact devices, smart phones, media devices, input/output (I/O) devices, tablet computers, appliances, intermediate stations, network interfaces, clients, servers, and/or portions thereof. Although server 10, network 130, network 101, and each of nodes 20A ... 20N may be referred to in the singular, it should be understood that each such respective component may comprise a plurality of such respective components without departing from this embodiment. In this embodiment, a network may be or comprise any mechanism, instrumentality, modality, and/or portion thereof that permits, facilitates, and/or allows, at least in part, two or more entities to be communicatively coupled together. In this embodiment, a heterogeneous network may be or comprise a network that includes two or more nodes whose respective constructions, operations, communication protocols, and/or other characteristics may vary, at least in part, from each other. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction may include data and/or one or more commands. In this embodiment, a packet may be or comprise one or more symbols and/or values, such as, for example, may be, comprise, be comprised, and/or embody one or more link (and/or other level) frames, transactions, and/or data entities. In this embodiment, a communication link may be or comprise any mechanism that is capable of and/or permits, at least in part, at least two entities to be or to become communicatively coupled.

In this embodiment, server 10 may comprise switch circuitry 56, one or more (and, in this embodiment, a plurality of) processors 30A ... 30N, computer-readable/writable memories 70A ... 70N, computer-readable/writable memory 21 (which may be or comprise at least one or multiple memories), and/or storage (e.g., which may be or comprise at least one or a plurality of storage devices) 32. Each of the processors 30A ... 30N may be communicatively coupled via one or more respective communication links 52A ... 52N to switch circuitry 56. Storage 32 may be coupled via one or more communication links 53 to switch circuitry 56. The processors 30A ... 30N may be communicatively coupled to (and/or comprise) one or more respective local memories 70A ... 70N. Memory 21 may be communicatively coupled via one or more communication links 51 to switch circuitry 56.

In this embodiment, each of the processors 30A ... 30N may be or comprise a respective multi-core, general purpose processor that may include one or more (and in this embodiment, a plurality of) respective processor/processor core cache memories. In this embodiment, a general purpose processor may be a processor that is capable of being reprogrammed, at least in part, for use in implementing, at least in part, more than one type of end user application, such as, for example, a general purpose microprocessor core. In this embodiment, a high level language may be a higher level language than, for example, microcode and/or machine code. For example, one or more processors 30A may comprise one or more (and in this embodiment, a plurality of) general purpose processors/processor cores 72A . . . 72N and one or more (and in this embodiment, a plurality of) associated, respective processor cache memories 62A . . . 62N. Each of the processor cores 72A . . . 72N may be associated with, comprise, and/or be communicatively coupled to one or more respective cache memories 62A . . . 62N. Each of the cache memories 62A . . . 62N may be or comprise a respective last level cache 63A . . . 63N. The respective construction and/or operation of each of the processors 30A . . . 30N may be substantially similar or identical; however, without departing from this embodiment, the respective construction and/or operation of two or more of such processors 30A . . . 30N may differ, at least in part. Also, without departing from this embodiment, two or more of the processor cores in a respective processor may share, at least in part, one or more cache memories and/or levels of such cache memory. Likewise, without departing from this embodiment, two or more of the processors may share, at least in part, one or more of the memories 70A . . . 70N.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, host processor, central processing unit, processor core, core, and controller each may comprise respective circuitry capable of performing, at least in part, one or more arithmetic and/or logical operations, and/or of executing, at least in part, one or more instructions. Although not shown in the Figures, server 10 and/or one or more nodes 20A . . . 20N each may comprise at least one graphical user interface system that may comprise, e.g., a respective keyboard, pointing device, and display system that may permit a human user to input commands to, and monitor the operation of, server 10, one or more nodes 20A . . . 20N, system 100, and/or one or more components thereof.

In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. In this embodiment, a last level cache of a processor and/or processor core may be or comprise one or more memories that (1) may be located in the same integrated circuit chip, die, substrate, and/or microelectronic device as the processor and/or processor core, and/or (2) may be accessed by the processor and/or processor core with less latency than one or more other memories can be accessed by the processor and/or processor core. For example, in this embodiment, last level cache 63A may be located in the same integrated circuit chip, die, substrate, and/or microelectronic device as the processor 30A and/or processor core 72A, and/or may be accessed by the processor 30A and/or processor core 72A with the least latency (e.g., compared and/or relative to the latency with which one or more other memories may be accessed by processor 30A and/or processor core 72A.

In this embodiment, switch circuitry (such as, for example, switch circuitry 56) may be or comprise circuitry that is capable of receiving, at least in part, forwarding, at least in part, and/or routing, at least in part, one or more packets. Such switch circuitry may, but is not required to be capable of modifying, at least in part, such one or more packets so as to permit, for example, the one or more packets (1) to comply and/or to be compatible with, at least in part, one or more protocols, (2) to address, at least in part, one or more next hops for the one or more packets, and/or (3) to be encrypted, at least in part.

In this embodiment, storage 32 may comprise not shown mass storage. In this embodiment, storage (such as, for example, storage 32) may be or comprise one or more apparatus into, and/or from which, data may be stored and/or retrieved, respectively. Also, in this embodiment, mass storage may be or comprise storage capable of non-volatile storage of data. For example, in this embodiment, mass storage may include, without limitation, one or more non-volatile electro-mechanical, magnetic, optical, and/or semiconductor storage devices.

One or more machine-readable program instructions may be stored, at least in part, in, for example, memory 21, one or more memories 70A . . . 70N, and/or one or more cache memories 62A . . . 62N. In operation of server 10, these machine-readable instructions may be accessed and executed by, for example, one or more of the processors 30A . . . 30N, one or more of the processor cores comprised in processors 30A . . . 30N, switch circuitry 56, storage 32, and/or one or more components thereof. When so accessed and executed, these one or more machine-readable instructions may result in performance of the operations that are described herein as being performed in and/or by the components of system 100. For example, one or more processors 30A . . . 30N and/or one or more processor cores comprised in processors 30A . . . 30N may be capable of accessing data and/or instructions stored in memory 21.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions.

As is described below, depending upon the particular configuration that may be selected for server 10 and/or switch circuitry 56, switch circuitry 56 may exchange data and/or commands via links 52A . . . 52N and/or 53 in accordance with one or more communication protocols that may comply and/or be compatible with PCI Express® interconnect protocol. Also depending upon the particular configuration that may be selected for server 10 and/or switch circuitry 56, switch circuitry 56 may exchange data and/or commands via links 50A . . . 50N in accordance with one or more communication protocols that may comply and/or be compatible with Ethernet protocol and/or Transmission Control Protocol/Internet Protocol (TCP/IP) protocol. For example, the PCI Express® interconnect protocol may comply and/or be compatible with PCI-SIG PCIe Base 3.0 Specification, Nov. 18, 2010. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Many different, additional, and/or other protocols may be used for such data and/or command exchange without departing from this embodiment (e.g., earlier and/or later-developed versions of the aforesaid, related, and/or other protocols).

Thus, in this embodiment, links 52A . . . 52N and/or 53 may be, comprise, or be comprised in a set of links that may use one or more communication protocols, while links 50A . . . 50N may be, comprise, or be comprised in another set of links that may use one or more other and/or different (at least in part) communication protocols.

In operation, one or more of the processors 30A . . . 30N (e.g., one or more processors 30A) that are (and/or are to be) comprised in server 10 may control, at least in part, data plane processing and control plane processing of the switch circuitry 56 that is (and/or is to be) comprised in server 10. Also in operation, one or more processors 30A may include one or more cache memories (e.g., one or more cache memories 62A) that may be involved in one or more data transfers that may involve at least one component (e.g., switch circuitry 56) of the server 10. These one or more data transfers may be carried out in a manner that by-passes (e.g., in whole or at least in part) involvement of system memory (e.g., memory 21 and/or memories 70A . . . 70N) of server 10. Also in operation, one or more processors 30A may select, at least part, the one or more communication protocols that may be used to carry out data and/or command exchange in, by, and/or via links 52A . . . 52N, 53, and/or 50A . . . 50N. Additionally, in operation, switch circuitry 56 may forward, at least in part, via one or more of these links 52A . . . 52N, 53, and/or 50A . . . 50N, one or more packets 65 that may be received by the switch circuitry 56.

In this embodiment, data plane processing may comprise processing that may relate to, implement, determine, facilitate, comprise, and/or involve, at least in part, packet forwarding and/or routing, such as, for example, determining based at least in part upon one or more forwarding and/or routing tables and/or algorithms the manner in which and/or path by which a packet is to be forwarded and/or routed. In this embodiment, control plane processing may comprise processing that may permit and/or facilitate data plane processing, such as, for example, processing that may relate to, implement, determine, facilitate, comprise, and/or involve, at least in part, (1) generating and/or constructing, at least in part, one or more such forwarding and/or routing tables, and/or (2) determining and/or discovering, at least in part, network and/or path topology. In this embodiment, data and/or control plane processing may result in and/or implement, at least in part, for example, load balancing, security processing, authentication processing, and/or encryption processing.

For example, switch circuitry 56 may include packet switch circuitry 82 and/or direct memory access (DMA) controller circuitry 83 that may be controlled, at least in part, by one or more of the processors 30A . . . 30N. Additionally, switch circuitry 56 may include one or more (and in this embodiment, a plurality of) ports 90A . . . 90N, 92, and/or 96A . . . 96N that may be capable of being selectively combined with each other (i.e., with one or more other such ports) and/or configured, in accordance with one or more commands provided to the switch circuitry 56 by one or more of the processors 30A . . . 30N, to produce one or more interfaces 110A . . . 110N, 112, and/or 113A . . . 113N that are to be used with the links 52A . . . 52N, 53, and/or 50A . . . 50N. One or more of the processors 30A . . . 30N, by appropriately controlling, e.g., these interfaces, ports, circuitry 82, and/or circuitry 83 of switch circuitry 56, may select and/or configure these and/or other components of switch circuitry 56 in such a way as to select, control, and/or manage, at least in part, the following parameters and/or characteristics concerning and/or related to switch 56, links 52A . . . 52N, 53, 50A . . . 50N, ports 90A . . . 90N, 92, 96A . . . 96N, and/or interfaces 110A . . . 110N, 112, 113A . . . 113N: (1) the respective communication protocols that these components may employ and/or use, (2) the respective data sizes/widths/line rate that they may accommodate and/or use, (3) the respective manner of their communication (simplex, duplex, etc.), (4) the respective type of interconnect used (e.g., memory coherent, memory non-coherent, etc.), (5) the forwarding and/or routing tables and/or processing algorithms employed, (6) whether data transfers between the processors 30A . . . 30N and the switch circuitry 56 are made indirectly (e.g., via server main system memory 21) or are made directly by writing to or reading from last level cache memories 63A . . . 63N, and/or (7) other and/or additional parameters, features, and/or characteristics (e.g., to facilitate implementation, at least in part, of one or more usage and/or network models/environments discussed below).

For example, by providing such appropriate control and/or management, ports 90A and/or 90B may be combined and/or configured to produce one or more interfaces 110A to be used with one or more links 52A and/or PCI Express® e.g., non-coherent) interconnect protocol, while one or more ports 90N and/or 92 may be configured to produce interfaces 110N and/or 112, respectively, that also may utilize PCI Express® (e.g., non-coherent) interconnect protocol. However, as a result at least in part of this combining and/or configuration, one or more interfaces 110A and/or one or more links 52A may operate at a relatively higher line rate and/or data width than ports 90N and/or 92 and/or interfaces 110N and/or 112 may operate.

Also for example, by providing such appropriate control and/or management, ports 96A and/or 96B may be combined and/or configured to produce one or more interfaces 113A to be used with one or more links 50A and/or TCP/IP and/or Ethernet protocol, while one or more ports 96N may be configured to produce one or more interfaces 113N that also may utilize TCP/IP and/or Ethernet protocol. However, as a result at least in part of this combining and/or configuration, one or more interfaces 113A and/or one or more links 50A may operate at a relatively higher line rate and/or data width than one or more ports 96N and/or one or more interfaces 113N may operate.

Data transfers between switch circuitry 56 and processors 30A . . . 30N and/or storage 53 may be carried out, at least in part, via DMA controller circuitry 83. Data transfers between switch circuitry 56 and nodes 20A . . . 20N may be carried out, at least in part, via packet switch circuitry 82.

Depending upon the parameters and/or characteristics selected by one or more of the processors 30A . . . 30N for switch circuitry 56, one or more data transfers between one or more of the processors 30A . . . 30N and/or switch circuitry 56 may be carried out in a manner that by-passes involvement of system memory 21, by accessing directly one or more cache memories and/or last level caches of one or more of the processors 30A . . . 30N. For example, in this embodiment, data transfer between one or more components (e.g., one or more of the processors 30A . . . 30N) of server 10 and one or more other components (e.g., one or more I/O devices that may be, comprise, and/or be comprised in switch circuitry 56) of server 10 may be carried out in this manner to reduce latency, increase throughput, reduce power consumption, and/or improve efficiency. Such data transfer may be carried out via a direct (or nearly direct) path from the switch circuitry 56 to one or more cache memories and/or last level caches of one or more of the processors 30A ... 30N and/or one or more processor cores comprised therein, without the involvement (or substantial involvement) of intervening storage in system memory 21. To achieve these and/or other benefits and/or advantages, such data transfers may operate entirely (or nearly entirely) out of cache memory and/or last level cache for both inbound and outbound data transfers. Such data transfers may involve and/or result in, at least in part, explicit invalidation of cache lines that may be used for transient data movement, thereby reducing and/or minimizing memory write back operations. Further and/or other details and/or advantages of techniques that may be employed in this embodiment to carry out such data transfers may be found in, for example, Vasudevan et al., U.S. Patent Publication No. 2009/0006668A1, published Jan. 1, 2009, entitled "Performing Direct Data Transactions With A Cache Memory." Of course, other and/or additional techniques may be used in and/or for carrying out data transfers between switch circuitry 56 and one or more processors 30A ... 30N without departing from this embodiment.

For example, if data 68 and/or one or more packets 65 are inbound, at least in part, to switch circuitry 56 and/or server 10 (e.g., data 68 may be obtained and/or comprised, at least in part, in one or more packets 65 received, at least in part, by switch circuitry 56), data 68 may be transferred (in and/or via one or more data transfer operations) by and/or via DMA controller circuitry 83 to last level cache 63A and/or one or more cache memories 62A associated with one or more processor cores 72A of one or more processors 30A. In these one or more data transfer operations, the switch circuitry 56 may be considered to be and/or may be involved as the producer of the data 68, and/or the one or more processor cores 72A and/or one or more processors 30A may be considered to be and/or may be involved as the consumer of the data 68. In so transferring such data 68, none of the components in server 10, including without limitation those involved in the one or more data transfer operations, may store, even temporarily, such data 68, at least in part, in memory 21. Instead, in these one or more data transfer operations, circuitry 83 may write the data 68 directly (e.g., without involvement of system memory 21) into one or more cache memories 62A and/or last level cache 63A. In the event that the amount and/or size of data 68 exceeds the amount of storage available in one or more cache memories 62A and/or last level cache 63A, at least one portion of the data 68 may be stored, at least in part, in memory 70A.

Also for example, if data 68 and/or one or more packets 65 are outbound, at least in part, from switch circuitry 56 and/or server 10 (e.g., data 68 is to be comprised in one or more packets 65 that are to be issued, at least in part, from switch circuitry 56 to one or more nodes 20A ... 20N), data 68 may initially be generated and stored in last level cache 63A and/or one or more cache memories 62A by one or more processor cores 72A. DMA controller circuitry 83 may transfer (in and/or via one or more data transfer operations) data 68 from last level cache 63A and/or one or more cache memories 62A to switch circuitry 56. In these one or more data transfer operations, the switch circuitry 56 may be considered to be and/or may be involved as the consumer of the data 68, and/or the one or more processor cores 72A and/or one or more processors 30A may be considered to be and/or may be involved as the producer of the data 68. In so transferring such data 68, none of the components in server 10, including without limitation those involved in the one or more data transfer operations, may store, even temporarily, such data 68, at least in part, in system memory 21. Instead, in these one or more data transfer operations, circuitry 83 may read the data 68 directly (e.g., without involvement of system memory 21) from one or more cache memories 62A and/or last level cache 63A, and switch circuitry 56 may generate and transmit one or more packets 65, containing at least in part data 68, to one or more nodes 20A ... 20N. In the event that the amount and/or size of data 68 exceeds the amount of storage available in one or more cache memories 62A and/or last level cache 63A, at least one portion of the data 68 may be stored, at least in part, in memory 70A.

In this embodiment, packet switch circuitry 82 may forward, at least in part, the one or more packets 65 either to or from the one or more nodes 20A ... 20N, depending upon whether the one or more packets 65 are being issued to or received from the one or more nodes 20A ... 20N. In this embodiment, the DMA controller circuitry 83 may forward, at least in part, the data 68, in and/or via the one or more data transfers, to or from the one or more cache memories 62A and/or last level cache 63A, depending upon whether the one or more processors 30A are the consumer or producer, respectively, of the data 68.

Figure 2:
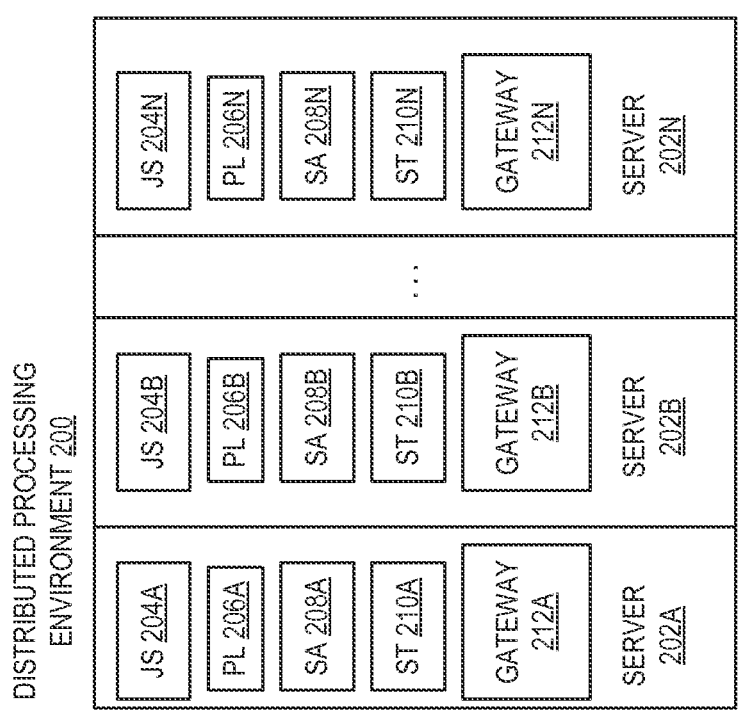
FIG. 2 illustrates features in an embodiment.

System 100 may be used in and/or to implement, at least in part, one or more usage models. For example, as shown in FIG. 2, the nodes 20A ... 20N may correspond to, be associated with, comprise, and/or be comprised in, at least in part, a set of servers 202A ... 202N. This set of servers 202A ... 202N may implement and/or be comprised in, at least in part, one or more distributed processing environments 200. One or more of the processors 30A ... 30N (e.g., one or more processors 30A) may control, at least in part, job scheduling (e.g., illustrated schematically by blocks 204A ... 204N) and/or process loading (e.g., illustrated schematically by blocks 206A ... 206N) in and/or of the set of servers 202A ... 202N.

In this embodiment, a distributed processing environment may comprise multiple processes executed, at least in part, in multiple nodes to implement one or more features, results, and/or functions. In this embodiment, a job may comprise a set of processes. Also in this embodiment, process loading (1) may be, comprise, and/or involve, at least in part, distribution, assignment, and/or allocation of processes to and/or between multiple nodes for execution, and/or (2) may result in and/or be specified in terms of, at least in part, one or more amounts of processing and/or other resources to be utilized and/or consumed.

One or more features, results, and/or functions that may be implemented, at least in part, in and/or by distributed processing environment 200 may vary depending upon, for example, the particular configuration and/or usage model of system 100. The particular configuration and/or usage model of system 100 may be selected and/or controlled, at least in part, by one or more of the processors 30A ... 30N (e.g., by these one or more of the processors 30A ... 30N appropriately controlling the configuration and/or operation of switch circuitry 56, the job scheduling and/or process loading of servers 202A ... 202N, etc.).

For example, depending at least in part upon the job scheduling and/or process loading selected, at least in part, by one or more of the processors 30A ... 30N, the set of servers 202A ... 202N in environment 200 (either atone or in combination with one or more components of server 10) may execute, at least in part, multiple security applications 208A ... 208N to implement, at least in part, one or more security-related features, results, and/or functions (e.g., authentication, virus scanning, intrusion protection/prevention, network data security/integrity features, etc.). Alternatively or additionally, depending at least in part upon the job scheduling and/or process loading selected, at least in part, by one or more of the processors 30A . . . 30N, the set of servers 202A . . . 202N in environment 200 (either alone or in combination with one or more components of server 10) may be, comprise, and/or implement, at least in part, one or more storage targets and/or storage target processes 210A . . . 210N to implement, at least in part, one or more storage-related features, results, and/or functions. Further alternatively or additionally, depending at least in part upon the job scheduling and/or process loading selected, at least in part, by one or more of the processors 30A . . . 30N, the set of servers 202A . . . 202N in environment 200 (either alone or in combination with one or more components of server 10) may be, comprise, and/or implement, at least in part, one or more gateways 212A . . . 212N to one or more heterogeneous networks 130.

Further alternatively or additionally, one or more storage target processes 210A . . . 210N may be executed, at least in part, by one or more of the processors 30A . . . 30N. In this configuration, the switch circuitry 56, server 10, storage 32, and/or these one or more target processes 210A . . . 210N may comprise one or more storage targets to be accessed (e.g., by one or more nodes 20A . . . 20N).

In this embodiment, a storage target may be or comprise (1) logical, physical, and/or virtual storage to be accessed, and/or (2) circuitry to facilitate such access. In this embodiment, an access may comprise a read and/or write. In this embodiment, a gateway may control, regulate, and/or manage, at least in part, access to one or more entities.

Figure 3:
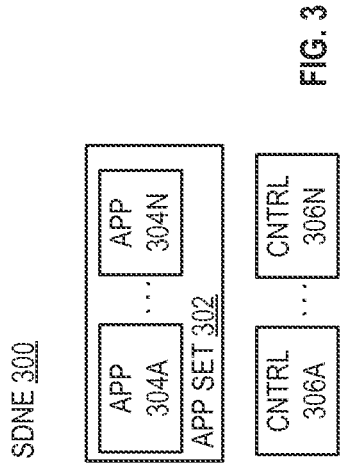
FIG. 3 illustrates features in an embodiment.

Further additionally or alternatively, environment 200 may be, comprise, be comprised in, and/or implement, at least in part, one or more software defined networking environments 300 (see FIG. 3). One or more environments 300 may comprise one or more application sets 302 that may comprise one or more (and in this embodiment, a plurality of) user applications 304A . . . 304N executed, at least in part, by the set of servers 202A . . . 202N. One or more environments 300 also may comprise one or more (and in this embodiment, a plurality of) software defined networking controllers 306A . . . 306N. In this embodiment, the controllers 306A . . . 306N may be implemented, at least in part, by one or more (and in this embodiment, respective) of the processors 30A . . . 30N and/or of the processor cores comprised in the processors 30A . . . 30N. For example, not shown processes executed by the processors 30A . . . 30N and/or the processor cores comprised in these processors 30A . . . 30N may result, at least in part, in the processors and/or processor cores operating as and/or functioning (either alone or in combination, at least in part, with switch circuitry 56) in the capacity of controllers 306A . . . 306N.

Figure 4:
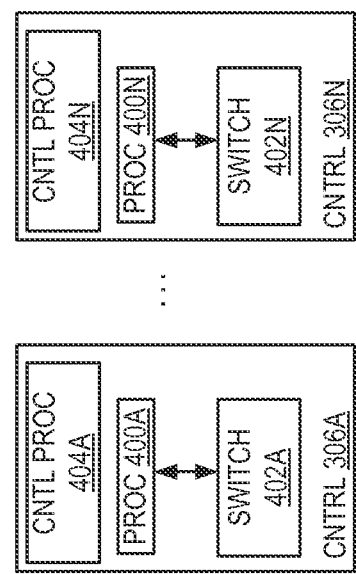
FIG. 4 illustrates features in an embodiment.

Additionally or alternatively, as shown in FIG. 4, the controllers 306A . . . 306N may comprise one or more respective processors (e.g., of similar construction to one or more processors 30A), alone, or in conjunction with one or more respective switches (e.g., comprising one or more respective copies of switch circuitry 56). For example, one or more controllers 306A may comprise one or more processors 400A that may be communicatively coupled to one or more switches 402A, and/or may execute one or more respective controller processes 404A. Also, for example, one or more controllers 306N may comprise one or more processors 400N that may be communicatively coupled to one or more switches 402N, and/or may execute one or more respective controller processes 404N. In this arrangement, the controllers 306A . . . 306N may be or comprise distributed software defined network controllers that may operate so as to provide respective virtual resource pools (e.g., comprising applications 304A . . . 304N) that may be run locally (in and/or via local, one or more not shown respective sets of servers coupled to the respective switches 402A . . . 402N). This operation of controllers 306A . . . 306N may result, at least in part, from the respective execution of distributed controller processes 404A . . . 404N by respective processors 400A . . . 400N. The distributed controllers 306A . . . 306N may interact and/or coordinate operations between or among themselves to obtain, maintain, and/or update data center-wide network rules/topology changes, and to maintain overall visibility of and/or into the entire software defined networking environment.

In this embodiment, a software defined networking environment may be, comprise, and/or implement, at least in part, one or more virtual networks that may be defined and/or implemented by one or more software processes, such as, for example, one or more virtual private and/or public data center and/or service networks. In this embodiment, a software defined networking controller may be or comprise, at least in part, one or more entities capable of controlling and/or managing, at least in part, one or more operations in, to, and/or involving, at least in part, one or more software defined networking environments.

Figure 5:
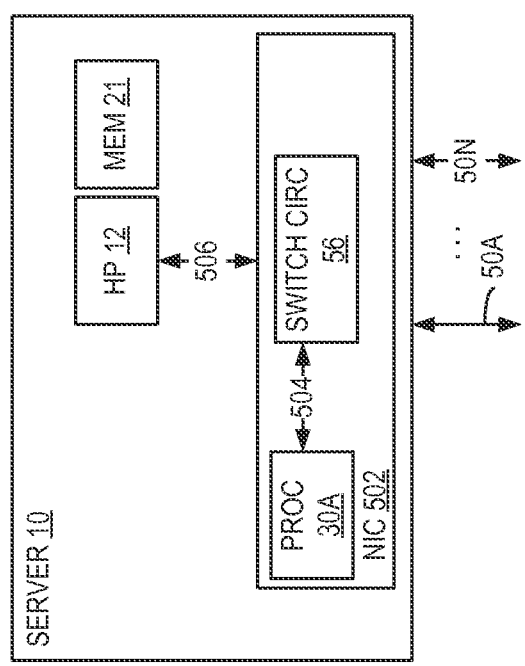
FIG. 5 illustrates features in an embodiment.

In a variation in this embodiment shown in FIG. 5, server 10 may comprise a network interface controller (NIC) 502 that may be communicatively coupled via one or more communication links 506 to one or more host processors 12. One or more host processors 12 may be or comprise one or more general purpose processors. NIC 502 also may be coupled to one or more communication links 50A 50N. In this variation, system memory 21 may be communicatively coupled to one or more host processors 12. NIC 502 may comprise switch circuitry 56 communicatively coupled via one or more communication links 504 to one or more processors 30A. In this variation, the one or more processors 30A may be controlled, at least in part, by one or more host processors 12. Thus, the configuration and/or operation of switch circuitry 56, links 506, 504, and/or 50A . . . 50N, and/or one or more processors 30A may be controlled, at least in part, by one or more host processors 12 in this embodiment. In this variation, switch circuitry 56 may classify and/or forward, at least in part, packets to the one or more processors 30A and/or one or more host processors 12 based at least in part upon one or more commands provided by one or more processors 30A and/or one or more host processors 12.

Thus, an embodiment may include at least one server processor that may control, at least in part, server switch circuitry data and control plane processing. The at least one processor may include at least one cache memory that is capable of being involved in at least one data transfer that involves at least one component of the server. The at least one data transfer may be carried out in a manner that by-passes involvement of server system memory. The switch circuitry may be communicatively coupled to the at least one processor and to at least one node via communication links. The at least one processor may select, at least in part, at least one communication protocol to be used by the links. The switch circuitry may forward, at least in part, via at least one of the links at least one received packet.

In this embodiment, the server processor may be or comprise one or more general purpose processors that may control, at least in part, the configuration and/or operation of the switch circuitry. Advantageously, this may permit the programming languages, technologies, interfaces, and/or techniques that may be used to program the server to also be generally compatible with and/or also capable of being used to program the switch. Advantageously, this may significantly decrease the amount of effort and/or expense involved in programming, modifying, and/or maintaining the merged server and switch of this embodiment. Further advantageously, this may significantly improve the programming flexibility of and/or increase the number and types of usage models in and/or to which this embodiment may be employed.

Also advantageously, in this embodiment, the switch circuitry and one or more processors may be comprised in a single respective server node (e.g., hop) in the network, and/or data may be written to and/or read from processor cache memory by the switch circuitry in a manner that may by-pass involvement of the server's system memory. Advantageously, this may significantly decrease data transmission and/or transfer latency, as well as, protocol processing in this embodiment. Further advantageously, this may permit programming languages, technologies, networking applications that heretofore may have run on switches to be capable of being run in the server and/or in a general processor programming environment. Many other advantages will be apparent.

Many other and/or additional modifications, variations, and/or alternatives are possible without departing from this embodiment. Accordingly, this embodiment should be viewed broadly as encompassing all such alternatives, modifications, and variations.

What is claimed is:

1. An apparatus comprising:
   at least one processor to be comprised in at least one server, the at least one server being at least one of a plurality of servers to be used to implement, at least in part, at least one software defined networking environment, the at least one processor being to control, at least in part, data plane processing and control plane processing of switch circuitry to be comprised in the at least one server, the at least one processor including at least one last level cache memory to be involved in at least one data transfer that involves at least one component of the at least one server, the at least one data transfer being capable of being carried out in a manner that by-passes involvement of system memory in the at least one server, the switch circuitry to be communicatively coupled to the at least one processor and to at least one node via communication links, the switch circuitry including packet switch circuitry, direct memory access (DMA) controller circuitry, and interfaces, the at least one processor being to select, at least in part, parameters related to the packet switch circuitry, the DMA controller circuitry, and the interfaces so as to select, at least in part, (1) data sizes, line rates, duplex/simplex manner of communication, and memory coherent/non-coherent type of interconnects to be used by the packet switch circuitry, the DMA controller circuitry, and the interfaces, (2) at least one communication protocol to be used by the links, and (3) whether the at least one data transfer is to be carried out indirectly via the system memory or the at least one data transfer is to be carried out via directly accessing the last level cache memory, the switch circuitry being to forward, at least in part, via at least one of the links at least one packet received by the switch circuitry;
   wherein:
      the directly accessing of the last level cache memory is to be carried out by the DMA controller circuitry, and in carrying out the directly accessing of the last level cache memory no component of the at least one server is to store in the system memory any data that is to be transferred to last level cache memory via the at least one data transfer;
   the at least one processor and the switch circuitry are to operate in such a way as to function as at least one software defined networking controller, the at least one software defined networking controller being capable of being used in (1) obtaining, maintaining, and updating data center-wide network rule and network topology changes, and (2) maintaining overall visibility of and into an entirety of the at least one software defined networking environment.

2. The apparatus of claim 1, wherein:
   the at least one data transfer involves the switch circuitry as the at least one component, the switch circuitry being a producer of data being transferred in the at least one data transfer;
   the at least one data transfer involves the at least one processor as a consumer of the data;
   the at least one processor comprises at least one processor core to process the data;
   the packet switch circuitry is to forward, at least in part, the at least one packet, the direct memory access controller circuitry being to forward at least in part in the at least one data transfer the data to the at least one cache memory in the at least one processor; and
   the at least one cache memory comprises a last level cache.

3. The apparatus of claim 1, wherein:
   the at least one processor comprises a plurality of processors, each of the processors comprising a respective general purpose processor that includes at least one respective processor core and at least one respective cache memory;
   the at least one node comprises a plurality of nodes;
   the switch circuitry includes ports to be selectively combined with each other and configured to produce the interfaces;
   the links include a first set of links and a second set of links; and
   the at least one communication protocol includes a first communication protocol and a second communication protocol, the first communication protocol to be used by the first set of links, the second communication protocol to be used by the second set of links, the first communication protocol being different, at least in part, from the second communication protocol.

4. The apparatus of claim 1, wherein:
   the switch circuitry is to be communicatively coupled to a set of servers;
   the set of servers is to implement, at least in part, at least one distributed processing environment; and
   the at least one processor is to control, at least in part, job scheduling and process loading of the set of servers in the at least one distributed processing environment.

5. The apparatus of claim 4, wherein:
   the distributed processing environment implements, at least in part, at least one of the following:
      at least one security application;
      at least one storage target;
      load balancing;
      at least one gateway to at least one heterogeneous network; and
      the at least one software defined networking environment.

6. The apparatus of claim 5, wherein:
the at least one software defined networking environment comprises the at least one software defined networking controller and at least one application set; and
the at least one application set is implemented, at least in part, by the set of servers.

7. The apparatus of claim 6, wherein:
the at least one software defined network controller comprises a plurality of software defined network controllers;
the controllers are implemented, at least in part, by a plurality of processors to execute, at least in part, controller processes, the processors being coupled to a plurality of switches; and
the at least one application set comprises a plurality of applications executed, at least in part, by the set of servers.

8. The apparatus of claim 1, wherein:
a network interface controller comprises at least one processor and the switch circuitry;
the at least one processor is to be controlled, at least in part, by at least one host processor; and
the at least one host processor is to be coupled to the switch circuitry via at least one other communication link.

9. A method comprising:
controlling, at least in part, by at least one processor to be comprised in at least one server, the at least one server being at least one of a plurality of servers to be used to implement, at least in part, at least one software defined networking environment, data plane processing and control plane processing of switch circuitry to be comprised in the at least one server, the at least one processor including at least one last level cache memory to be involved in at least one data transfer that involves at least one component of the at least one server, the at least one data transfer being capable of being carried out in a manner that by-passes involvement of system memory in the at least one server, the switch circuitry to be communicatively coupled to the at least one processor and to at least one node via communication links, the switch circuitry including packet switch circuitry, direct memory access (DMA) controller circuitry, and interfaces, the at least one processor being to select, at least in part, parameters related to the packet switch circuitry, the DMA controller circuitry, and the interfaces so as to select, at least in part, (1) data sizes, line rates, duplex/simplex manner of communication, and memory coherent/non-coherent type of interconnects to be used by the packet switch circuitry, the DMA controller circuitry, and the interfaces, (2) at least one communication protocol to be used by the links, and (3) whether the at least one data transfer is to be carried out indirectly via the system memory or the at least one data transfer is to be carried out via directly accessing the last level cache memory, the switch circuitry being to forward, at least in part, via at least one of the links at least one packet received by the switch circuitry;
wherein:
the directly accessing of the last level cache memory is to be carried out by the DMA controller circuitry, and in carrying out the directly accessing of the last level cache memory no component of the at least one server is to store in the system memory any data that is to be transferred to last level cache memory via the at least one data transfer;
the at least one processor and the switch circuitry are to operate in such a way as to function as at least one software defined networking controller, the at least one software defined networking controller being capable of being used in (1) obtaining, maintaining, and updating data center-wide network rule and network topology changes, and (2) maintaining overall visibility of and into an entirety of the at least one software defined networking environment.

10. The method of claim 9, wherein:
the at least one data transfer involves the switch circuitry as the at least one component, the switch circuitry being a producer of data being transferred in the at least one data transfer;
the at least one data transfer involves the at least one processor as a consumer of the data;
the at least one processor comprises at least one processor core to process the data;
the packet switch circuitry is to forward, at least in part, the at least one packet, the direct memory access controller circuitry being to forward at least in part in the at least one data transfer the data to the at least one cache memory in the at least one processor; and
the at least one cache memory comprises a last level cache.

11. The method of claim 9, wherein:
the at least one processor comprises a plurality of processors, each of the processors comprising a respective general purpose processor that includes at least one respective processor core and at least one respective cache memory;
the at least one node comprises a plurality of nodes;
the switch circuitry includes ports to be selectively combined with each other and configured to produce the interfaces;
the links include a first set of links and a second set of links; and
the at least one communication protocol includes a first communication protocol and a second communication protocol, the first communication protocol to be used by the first set of links, the second communication protocol to be used by the second set of links, the first communication protocol being different, at least in part, from the second communication protocol.

12. The method of claim 9, wherein:
the switch circuitry is to be communicatively coupled to a set of servers;
the set of servers are to implement, at least in part, at least one distributed processing environment; and
the at least one processor is to control, at least in part, job scheduling and process loading of the set of servers in the at least one distributed processing environment.

13. The method of claim 12, wherein:
the distributed processing environment implements, at least in part, at least one of the following:
at least one security application;
at least one storage target;
at least one gateway to at least one heterogeneous network; and
the at least one software defined networking environment.

14. The method of claim 13, wherein:
the at least one software defined networking environment comprises the at least one software defined networking controller and at least one application set; and
the at least one application set is implemented, at least in part, by the set of servers.

15. The method of claim 14, wherein:
the at least one software defined network controller comprises a plurality of software defined network controllers;
the controllers are implemented, at least in part, by a plurality of processors to execute, at least in part, controller processes, the processors being coupled to a plurality of switches; and
the at least one application set comprises a plurality of applications executed, at least in part, by the set of servers.

16. The method of claim 9, wherein:
a network interface controller comprises at least one processor and the switch circuitry;
the at least one processor is to be controlled, at least in part, by at least one host processor; and
the at least one host processor is to be coupled to the switch circuitry via at least one other communication link.

17. A computer-readable memory storing one or more instructions that when executed by a machine result in performance of operations comprising:
controlling, at least in part, by at least one processor to be comprised in at least one server, the at least one server being at least one of a plurality of servers to be used to implement, at least in part, at least one software defined networking environment, data plane processing and control plane processing of switch circuitry to be comprised in the at least one server, the at least one processor including at least one last level cache memory to be involved in at least one data transfer that involves at least one component of the at least one server, the at least one data transfer being capable of being carried out in a manner that by-passes involvement of system memory in the at least one server, the switch circuitry to be communicatively coupled to the at least one processor and to at least one node via communication links, the switch circuitry including packet switch circuitry, direct memory access (DMA) controller circuitry, and interfaces, the at least one processor being to select, at least in part, parameters related to the packet switch circuitry, the DMA controller circuitry, and the interfaces so as to select, at least in part, (1) data sizes, line rates, duplex/simplex manner of communication, and memory coherent/non-coherent type of interconnects to be used by the packet switch circuitry, the DMA controller circuitry, and the interfaces, (2) at least one communication protocol to be used by the links, and (3) whether the at least one data transfer is to be carried out indirectly via the system memory or the at least one data transfer is to be carried out via directly accessing the last level cache memory, the switch circuitry being to forward, at least in part, via at least one of the links at least one packet received by the switch circuitry;
wherein:
the directly accessing of the last level cache memory is to be carried out by the DMA controller circuitry, and in carrying out the directly accessing of the last level cache memory no component of the at least one server is to store in the system memory any data that is to be transferred to last level cache memory via the at least one data transfer;
the at least one processor and the switch circuitry are to operate in such a way as to function as at least one software defined networking controller, the at least one software defined networking controller being capable of being used in (1) obtaining, maintaining, and updating data center-wide network rule and network topology changes, and (2) maintaining overall visibility of and into an entirety of the at least one software defined networking environment.

18. The computer-readable memory of claim 17, wherein:
the at least one data transfer involves the switch circuitry as the at least one component, the switch circuitry being a producer of data being transferred in the at least one data transfer;
the at least one data transfer involves the at least one processor as a consumer of the data;
the at least one processor comprises at least one processor core to process the data;
the packet switch circuitry is to forward, at least in part, the at least one packet, the direct memory access controller circuitry being to forward at least in part in the at least one data transfer the data to the at least one cache memory in the at least one processor; and
the at least one cache memory comprises a last level cache.

19. The computer-readable memory of claim 17, wherein:
the at least one processor comprises a plurality of processors, each of the processors comprising a respective general purpose processor that includes at least one respective processor core and at least one respective cache memory;
the at least one node comprises a plurality of nodes;
the switch circuitry includes ports to be selectively combined with each other and configured to produce the interfaces;
the links includes a first set of links and a second set of links; and
the at least one communication protocol including a first communication protocol and a second communication protocol, the first communication protocol to be used by the first set of links, the second communication protocol to be used by the second set of links, the first communication protocol being different, at least in part, from the second communication protocol.

20. The computer-readable memory of claim 17, wherein:
the switch circuitry is to be communicatively coupled to a set of servers;
the set of servers is to implement, at least in part, at least one distributed processing environment; and
the at least one processor is to control, at least in part, job scheduling and process loading of the set of servers in the at least one distributed processing environment.

21. The computer-readable memory of claim 20, wherein:
the distributed processing environment implements, at least in part, at least one of the following:
at least one security application;
at least one storage target;
at least one gateway to at least one heterogeneous network; and
the at least one software defined networking environment.

22. The computer-readable memory of claim 21, wherein:
the at least one software defined networking environment comprises the at least one software defined networking controller and at least one application set; and
the at least one application set is implemented, at least in part, by the set of servers.

23. The computer-readable memory of claim 22, wherein:
the at least one software defined network controller comprises a plurality of software defined network controllers;

the controllers are implemented, at least in part, by a plurality of processors to execute, at least in part, controller processes, the processors being coupled to a plurality of switches; and the at least one application set comprises a plurality of applications executed, at least in part, by the set of servers.

24. The computer-readable memory of claim 17, wherein:

a network interface controller comprises at least one processor and the switch circuitry;

the at least one processor is to be controlled, at least in part, by at least one host processor; and the at least one host processor is to be coupled to the switch circuitry via at least one other communication link.

25. The apparatus of claim 1, wherein:

the system memory comprise multiple memories to be accessed by the at least one processor; and the apparatus comprises storage to be communicatively coupled to the switch circuitry, the storage comprising multiple storage devices.

* * * * *